United States Patent

[11] 3,589,023

[72] Inventor Francis John Figiel
Boonton, N.J.
[21] Appl. No. 831,890
[22] Filed June 10, 1969
[45] Patented June 29, 1971
[73] Assignee Allied Chemical Corporation
New York, N.Y.

[54] PROCESS AND APPARATUS FOR REMOVING WATER FROM SOLID SURFACES AT LOW TEMPERATURES
17 Claims, 2 Drawing Figs.

[52] U.S. Cl. ............................................. 34/9, 34/60
[51] Int. Cl. ............................................. F26b 3/00
[50] Field of Search ................................. 34/9, 60

[56] References Cited
UNITED STATES PATENTS
3,386,181 6/1968 Steinacker ............... 34/9

*Primary Examiner*—John J. Camby
*Attorney*—Jay P. Friedenson

ABSTRACT: Process for removing water from a nonabsorbent article comprises immersing an article containing a water contaminated surface into a nonboiling solvent liquid bath which solvent is heavier than water and in which water is about 0.1—5 percent by weight soluble, to displace water therefrom, causing the displaced water and solvent to overflow into a separation zone wherein water is removed from the system and solvent is returned to the nonboiling solvent liquid bath, and removing the article from the nonboiling solvent liquid bath. A preferred solvent is an azeotropic mixture of about 97 weight percent 1,1,2-trichloro-1,2,2-trifluoroethane and about 3 weight percent isopropanol. Apparatus comprises a dewatering sump adapted to contain a liquid at a temperature below its boiling point and in a substantially quiescent state, and preferably equipped with cooling means, a water separating sump possessing a smaller surface area than the dewatering sump adapted to receive liquid which overflows from the dewatering sump, means for removing water from the upper portion of the water separating sump and means for transferring liquid from the lower portion of the water separating sump to the dewatering sump.

PATENTED JUN29 1971　　3,589,023

INVENTOR.
FRANCIS J. FIGIEL
BY
*Jay P. Fredenson*
ATTORNEY

PROCESS AND APPARATUS FOR REMOVING WATER FROM SOLID SURFACES AT LOW TEMPERATURES

BACKGROUND OF THE INVENTION

There is a need in the art for procedure and equipment for the rapid and efficient drying of a variety of nonabsorbent articles. For example, silicon wafers, copper and glass components used in miniaturized electronic circuits need to be dried quickly and thoroughly to avoid the formation of drying stains on the surfaces of such articles. Such stains comprise water-soluble soil material which would adversely affect the electrical properties of these articles. Articles which are heat sensitive, such as certain plastics and metallic parts, cause additional problems in that temperatures used during the drying technique should not adversely affect the articles. A variety of methods and equipment have been devised in order to satisfactorily dry such articles and all suffer from one or more serious disadvantages. Thus, methods which are based on the use of air for evaporative drying are disadvantageous because high temperatures are employed and because the use of air in certain circumstances permits the formation of oxide films on the articles which adversely affects electrical properties. Solvent drying techniques and apparatus which are known in the art suffer from various disadvantages such as use of flammable solvents, contamination of the dried articles with an additional material such as a detergent which has to be removed, failure to provide a continuous mode of operation, and complication of equipment and equipment parts resulting in increased capital costs and operating expenses.

It is accordingly an object of this invention to provide a continuous dewatering process and apparatus capable of effectively and quickly removing water from the surfaces of water contaminated articles, without suffering from the disadvantages possessed by previously known drying methods and equipment.

A specific object of this invention is to provide a novel apparatus for drying water-contaminated nonabsorbent articles which is simple in construction and operation and which therefore requires low capital costs and operating expenses.

Another specific object of the invention is to provide a novel process and apparatus for quickly removing water from the surfaces of heat sensitive articles at temperatures below about 80° F.

Other objects and advantages of the invention will be apparent from the following description:

SUMMARY OF THE INVENTION

It has been discovered that the above objectives can be accomplished by the following method and apparatus.

The method comprises essentially immersing an article containing a water contaminated surface into a first solvent liquid bath comprising a liquid having a density greater than that of water and in which water is between about 0.1—5 percent by weight soluble, the solvent liquid being maintained at a temperature below its boiling point and in a substantially quiescent state. Water which is displaced from the article floats on the top of the solvent liquid bath. The displaced water, with accompanying amounts of solvent liquid displaced with the bath, overflows into a water separation zone. Water and the heavier solvent liquid are permitted to separate into two phases therein. Water which is collected in the water separation zone is continuously withdrawn from the system. Solvent liquid which is collected in the water separation zone is continuously removed from the water separation zone and is recycled to the solvent liquid bath at a rate sufficient to replace the solvent liquid displaced from the solvent liquid bath.

The apparatus comprises essentially the following in combination: A dewatering sump adapted to contain a liquid at a temperature below its boiling point and in a substantially quiescent state, a water-separating sump possessing a smaller surface area than the dewatering sump adapted to receive liquid which overflows from the dewatering sump, means for removing water from the upper portion of the water-separating sump, and means for transferring liquid from the lower portion of the water-separating sump to the dewatering sump. The dewatering sump is free of means such as baffles or agitators which would create turbulence in the liquid contained therein. If it is desired to operate at temperatures above room temperature but below the boiling point of the solvent, a heater can be situated in the dewatering sump for this purpose.

DETAILED DESCRIPTION OF THE INVENTION AND OF THE PREFERRED EMBODIMENTS

Figure 2:
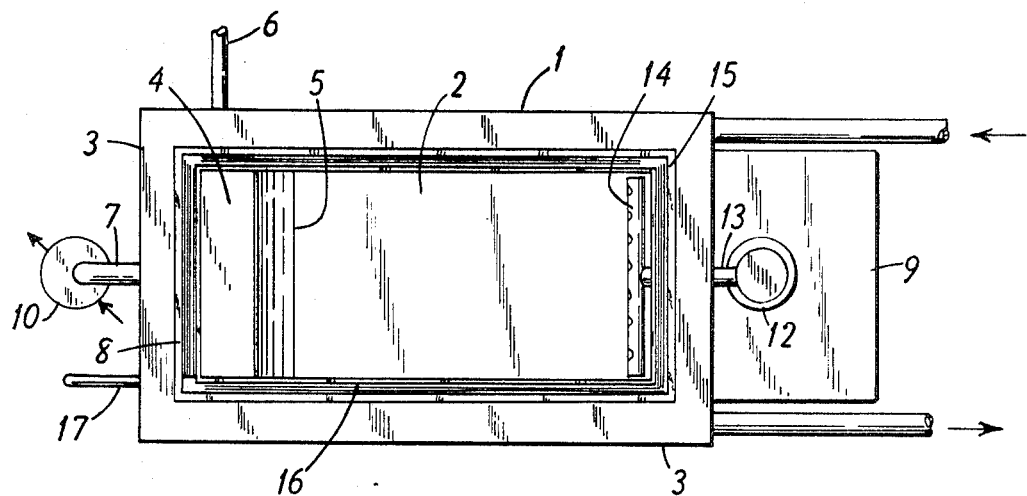
FIG. 2 is a plan view of the embodiment of FIG. 1.

Solid surfaces which can be treated in accordance with the invention may be constructed of a wide variety of nonabsorbent solid materials which are commonly used in manufacturing shaped articles. The material of construction of the article should, of course, be inert to the solvent employed. Illustrative materials of construction include a variety of metallic materials such as ferrous metals, copper, nickel, chromium, stainless steel, aluminum and alloys thereof. Examples of suitable nonmetallic materials are glass and plastics, such as polytetrafluoroethylene, polychlorotrifluoroethylene, polyethylene and nylon. The articles may be formed as machined parts such as silicon wafers, copper printed boards and the like, or may be formed as unmachined parts such as aluminum corrugation and strip stock. The shape of the article is not critical for the process and apparatus of the invention are effective in removing even small traces of water from small cracks and crevices as well as from large surfaces.

The solvent which is used in the process is critical. Essentially, the solvent must be one which is heavier than water and in which water is between about 0.1—5percent by weight soluble. Any solvent which meets these characteristics is operable in the subject process. Approximately a 0.1percent by weight minimum solubility of water in the solvent is necessary in order for the solvent to penetrate the water film and readily displace the water. Preferably, however, the solvent should be one in which water is a least 0.5percent by weight soluble. If water is more than about 5 percent by weight soluble in the solvent, sufficiently efficient separation of water from solvent is not possible according to the invention process. The ideal solvent for the novel process is one which possesses all of the following characteristics: maintains its original composition, temporarily decreases the overall surface free energy in order to break up water films and wet the substrate, effectively washes water from the wetted objects, is essentially immiscible with water, and evaporates without leaving a stain. A number of single substances may be used alone in the novel method. Illustrative of such single substances are the following: 1,1,2-trichloro-1,2,2-trifluoroethane and tetrachlorodifluoroethane. (Tetrachlorodifluoroethane may be used alone as the sym- or unsym-isomer. It is sold commercially, however, as a mixture of these two isomers and may be used as a solvent in the process described herein in this form. The isomeric mixture behaves like a single substance and will be so regarded herein.) There is no single substance known which is outstanding for the present purposes, however, solvents which perform better than the single substances known may be devised by mixing two or more single solvent materials. In the light of the above discussion, one of ordinary skill in the art can readily devise suitable solvent mixtures by routine testing and evaluation for the desired properties.

A preferred class of solvent mixtures is that in which the mixture contains at least one substantially water-immiscible halogenated hydrocarbon component boiling between about 0°—100° C. and having a density greater than about 1.3 gm./cm.$^3$ at 20° C. and at least one nonhalogenated organic liquid miscible with the halogenated hydrocarbon component and with water, which boils between about 0°—150° C. and has a density less than about 1.0 gm./cm.$^3$ at 20° C. Surprisingly, it has been found that the presence of water as an azeotrope with one or more of the mixture components does not adversely affect the invention process.

A particularly effective class of solvents are two component solvents in which the water-immiscible and water-miscible components are as described above and in which the water-immiscible component constitutes between about 80—99.5 wt. percent of the mixture. The preferred water-immiscible component is a member of the group consisting of 1,1,2-trichloro-1,2,2-trifluoroethane and tetrachlorodifluoroethane. The preferred water-miscible component is selected from the group consisting of methanol, ethanol, *n*-propanol, isopropanol, acetonitrile, acetone, nitromethane and dioxane.

The preferred solvent is a mixture of 1,1,2-trichloro-1,2,2-trifluoroethane and isopropanol. The weight percent of 1,1,2-trichloro-1,2,2-trifluoroethane should be in the range of about 85—98 percent, still preferably from 90—98 percent, and most preferably about 97 percent. The 97 weight percent mixture is most preferred because it is a constant boiling azeotropic mixture which maintains its composition during use.

The novel process and apparatus of the invention may be more readily understood by reference to the drawings which illustrate a preferred embodiment.

Figure 1:
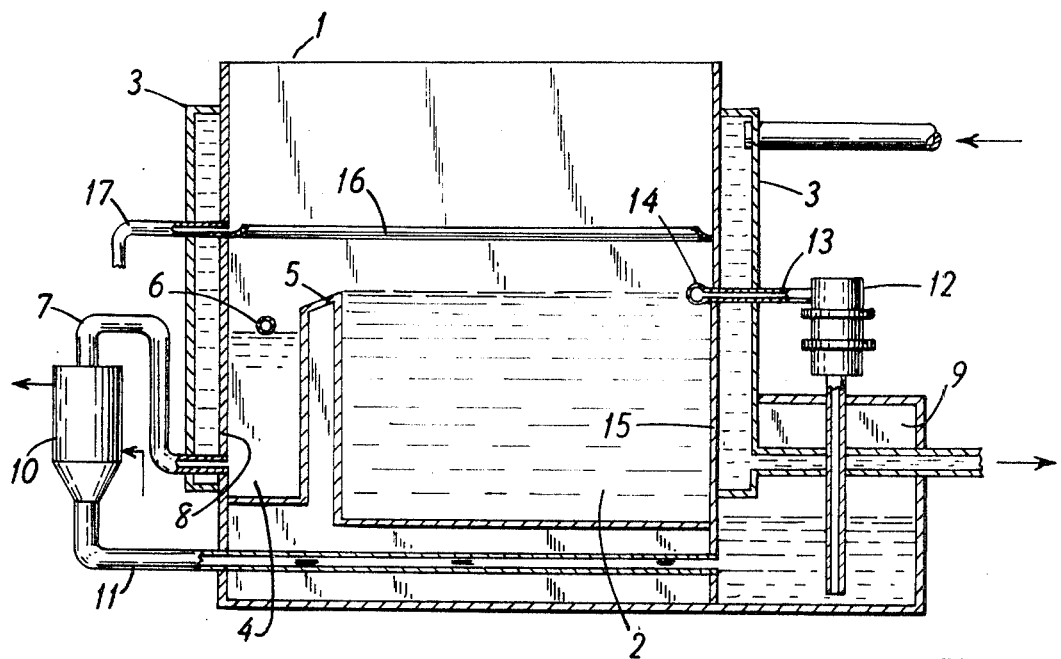
FIG. 1 is a front view in partial half section of one embodiment of the invention showing the component parts integrally contained in an open-top treatment vessel.

Although all the apparatus components need not be assembled in a single container, in the preferred embodiment of FIGS. 1 and 2, the components are all assembled in an open top treatment vessel 1. A rectangular dewatering sump 2, cooled by coolant jacket 3, is positioned adjacent a rectangular water-separating sump 4 so that liquid contained in the dewatering sump can overflow over wall 5 of dewatering sump 2 into the water separating sump 4. The water separating sump has a smaller surface area than the dewatering sump. Water-separating sump 4 is equipped with an overflow pipe 6 which protrudes from the upper portion of the water-separating sump and extends outwardly through the wall of treatment vessel 1 and coolant jacket 3, permitting the continuous removal of water which rises to the surface of the solvent and water mixture which collects in water-separating sump 4. Coolant jacket 3 extends around water-separating sump 4. Coolant jacket 3 is not essential to the operation of the apparatus for all applications but is necessary if it is desired to conduct the drying operation below room temperature. A drain pipe 7 in the lower portion of water separating sump 4 extends outwardly through the wall 8 of the water separating sump and runs upwardly and parallel to wall 8 before turning to empty into reservoir 9, permitting the continuous transfer of solvent collected towards the bottom of water-separating sump 4 to reservoir 9. The height of drain pipe 7 determines the level of solvent in water-separating sump 4. Overflow pipe 6 is connected to the water-separating sump at a point slightly below the level of drain pipe 7.

It is essential that the area of water-separating sump 4 is smaller than the surface area of dewatering sump 2. Preferably, the ratio of the area of the opening of the water-separating sump 4 to the area of the opening of the dewatering sump 2 should be between about 1:5 and 1:100 and still preferably between about 1:10 and 1:20.

Solvent removed from the water-separating sump 4 through drain pipe 7 is optionally conveyed through drier 10 and from there is fed to reservoir 9 through pipe 11. Pump 12 then feeds the solvent through pipe 13 into dewatering sump 2. Preferably, as best shown in FIG. 2, pipe 13 terminates with a perforated section 14 which is parallel to sidewall 15 of dewatering sump 2 and extends for a substantial portion of the length of sidewall 15. Perforated section 14 of pipe 13 terminates on a level with the top of dewatering sump 2 so that the solvent feed through this member helps push the water layer rising to the top of the solvent liquid in dewatering sump 2 over wall 5 into water-separating sump 4. Optionally, but preferably, a trough 16 is provided around the perimeter of the treatment vessel above dewatering sump 2 to collect condensed water vapor which may collect on the walls of the treatment vessel due to environmental conditions. Obviously, condensation of water on the walls of the treatment vessel will be more pronounced when the system is operated with cooling. Condensed water may be removed from the trough by means of a drain pipe, such as 17. The shapes and configurations of water-separating sump 4 and dewatering sump 2 are not critical. In another embodiment, for example, not shown in the drawings, water-separating sump 4 is essentially U-shaped and the dewatering sump 2 is rectangular in shape and is positioned within the U of the water-separating sump so that overflow of liquid from the dewatering sump into the water-separating sump can take place over three walls of the dewatering sump.

In operation, a suitable solvent liquid is charged to completely fill dewatering sump 2 and partially fill reservoir 9. Cooling agent, for example water, at the desired temperature, is circulated through coolant jacket 3 if the drying operation is to be conducted below room temperature. The temperature at which the drying operation is conducted may vary according to particular needs. For the present purposes, the temperature may vary from 0° C. to the boiling point of the solvent. Preferably, room temperature or below is employed. The article to be treated is immersed into the solvent liquid bath of dewatering sump 2. The solvent displaces the water from the article and the displaced water floats to the surface of the heavier, substantially water-immiscible solvent, first as small droplets and later as a thin continuous layer as greater quantities of water are displaced. The volume of the article immersed in dewatering sump 2, as well as the volume of water displaced, causes liquid to overflow from dewatering sump 2 over wall 5 into water separating sump 4. This liquid comprises essentially the water layer formed on top of the heavier solvent layer in dewatering sump 2, together with quantities of displaced solvent. The solvent and water which collect in water-separating sump 4 separate into two layers, the heavier solvent layer on the bottom. The upper water layer is continuously withdrawn through overflow pipe 6. The lower solvent layer is withdrawn through drain pipe 7 and passes through drier 10 and from there via pipe 11 into reservoir 9. From reservoir 9 the solvent liquid is pumped by means of pump 12 through pipe 13 into dewatering sump 2. The cycle rate of solvent into dewatering sump 2 is regulated so as to maintain the level of solvent in dewatering sump 2 at the top of the sump. No substantial amount of solvent is lost from the system, except incidentally as vapor loss. Solvent makeup can be added to the system if necessary.

The length of time of immersion of the article in the liquid bath of dewatering sump 2 is not critical. Generally, between about 10—30 seconds dip time is all that is required. Preferably, the dip time is between about 20—30 seconds. A gentle swirling-type action may be imparted to the bath in which the article is immersed in order to aid in the displacement of water. It is not desired to significantly agitate this bath, however, since this would promote increased solubility of the water in the solvent and complicate subsequent water separation. Accordingly, the solvent liquid bath in the dewatering sump is maintained in a substantially quiescent state.

When the article is withdrawn from the solvent liquid bath in the dewatering sump, it is exposed to the atmospheric environment until any traces of solvent film evaporate.

The following examples illustrate practice of the invention and the results obtained.

EXAMPLE I

This example illustrates the effectiveness of the use of a solvent mixture comprising the azeotrope of about 97 weight percent 1,1,2-trichloro-1,2,2-trifluoroethane and about 3 weight percent isopropanol in drying water-contaminated articles according to the novel process and apparatus.

The apparatus employed is substantially as shown in FIG. 1. The capacities of dewatering sump 2 and reservoir 9 are 1 gallon each. The ratio of surface area of water separating sump 4 to the surface area of dewatering sump 2 is 1:10. The 1 gallon dewatering sump is completely filled with the indicated solvent. Reservoir 9 is charged with one half gallon of the indicated solvent. The drying operation is conducted at room temperature, accordingly no cooling agent is circulated through coolant jacket 3.

A cluster of four steel strips, each ¾ inch × 5 inches and contaminated with water, is dipped into the solvent liquid contained in dewatering sump 2 and removed after about 10 seconds. The cluster of steel strips is then exposed to room environment temperature for about 3 minutes. At the end of this period the steel strip cluster is dipped into a flask containing 125 ml. of anhydrous isopropanol. The strip cluster is thoroughly washed in the isopropanol and is removed from the flask. The amount of water contained on the wet strip cluster is determined by weight comparison of the strip cluster before and after contamination by water. The amount of water dissolved in the solvent charged to the system and in the isopropanol before and after the wash is determined with Karl Fischer apparatus and reagent (ASTM D 1744—64). The results of the water analysis is shown in the following table.

TABLE

| Sample | Amount of water |
| --- | --- |
| Solvent charged to the drying system, p.p.m.[1] | 50 |
| 125 ml. isopropanol before drying procedure gm. | 0.025 |
| Wet strip cluster, gm. | 0.54 |
| 125 ml. isopropanol after the drying procedure, gm | 0.024 |

[1] Parts per million.

The above data show that the strip cluster is thoroughly dry after treatment in accordance with the invention process and that the presence of 50 p.p.m. water in the solvent charged to the system has no adverse effect on the drying process.

EXAMPLE II

The procedure of example 1 is repeated except that the solvent charged to the drying system contains 400 p.p.m. water. At the end of the drying operation, the 125 ml. isopropanol solution contains 0.025 gms. water. This data show that the presence of 400 p.p.m. water in the solvent charged to the system has no adverse affect on the drying process and that the system has the capability of effectively removing water which is introduced.

EXAMPLE III

The procedure of example I is repeated excepting that the solvent used is a mixture consisting of about 96 weight percent 1,1,2-trichloro-1,2,2-trifluoroethane and about 4 weight percent ethanol. The result is substantially the same, that is to say, that the isopropanol solution after the drying operation contains no more water than it contained before the drying operation.

EXAMPLE IV

The procedure of example I is repeated excepting that the solvent used is a mixture consisting of about 88 weight percent 1,1,2-trichloro-1,2,2-trifluorethane and about 12 weight percent acetone. The result is substantially the same, that is to say, that the isopropanol solution after the drying operation contains no more water than it contained before the drying operation.

It will be apparent to those skilled in the art that numerous modifications and changes may be made to the embodiments described herein without departing from the scope and spirit of the invention.

I claim:

1. A method for removing water from a nonabsorbent article which comprises:
    a. immersing an article containing a water contaminated surface into a solvent liquid bath comprising a liquid having a density greater than that of water and in which water is between 0.1—5 percent by weight soluble, the solvent liquid being maintained at a temperature below its boiling point and in a substantially quiescent state, whereby the water which is displaced floats on the top of the solvent liquid bath,
    b. causing the displaced water with accompanying amounts of solvent liquid displaced from the bath, to overflow into a water separation zone and permitting water and the heavier solvent liquid to separate into two phases therein,
    c. withdrawing from the system water which is collected in the water separation zone,
    d. removing solvent liquid which collects in the water separation zone
    e. recycling the solvent liquid removed from the water separation zone to the solvent liquid bath at a rate sufficient to replace the solvent liquid displaced from the solvent liquid bath, and
    f. removing the article from the solvent liquid bath.
2. The method according to claim 1 in which the solvent is one in which water is between about 0.5—5 percent by weight soluble.
3. The method according to claim 2 in which the solvent contains at least one substantially water-immiscible halogenated hydrocarbon component boiling between about 0°—100° C. and having a density greater than about 1.3 gm./cm.$^3$ at 20° C. and at least one nonhalogenated organic liquid miscible with the halogenated hydrocarbon component and with water which boils between about 0°—150° C. and has a density less than about 1.0 gm./cm.$^3$ at 20° C.
4. The method according to claim 3 in which the solvent is a two component mixture in which the substantially water-immiscible component constitutes between about 80—99.5 weight percent of the mixture.
5. The method according to claim 4 in which the substantially water-immiscible component is a member of the group consisting of 1,1,2-trichloro-1,2,2-trifluoroethane and tetrachlorodifluoroethane and in which the water-miscible component is a member of the group consisting of methanol, ethanol, n-propanol, isopropanol, acetonitrile, acetone, nitromethane and dioxane.
6. The method according to claim 5 in which the substantially water-immiscible component is 1,1,2-trichloro-1,2,2-trifluoroethane and in which the water-miscible component is isopropanol.
7. The method according to claim 6 in which the solvent mixture contains between about 90—98 weight percent of 1,1,2-trichloro-1,2,2-trifluoroethane.
8. The method according to claim 7 in which the solvent mixture is an azeotropic mixture consisting of about 97 weight percent of 1,1,2-trichloro-1,2,2-trifluoroethane and about 3 weight percent isopropanol.
9. The method according to claim 5 in which the substantially water-immiscible component is 1,1,2-trichloro-1,2,2-trifluoroethane and in which the water-miscible component is ethanol.
10. The method according to claim 5 in which the substantially water-immiscible component is 1,1,2-trichloro-1,2,2-trifluoroethane and in which the water-miscible component is acetone.
11. Apparatus for the removal of water from nonabsorbent articles which comprises in combination:
    a. a dewatering sump adapted to contain a liquid at a temperature below its boiling point and free of means to create turbulence in liquid contained within said sump,
    b. a watering separating sump possessing a smaller surface area than the dewatering sump adapted to receive liquid which overflows from the dewatering sump,
    c. means for removing water from the upper portion of the water-separating sump, and d. means for transferring liquid from the lower portion of the water-separating sump to the dewatering sump.

12. Apparatus for the removal of water from nonabsorbent articles which consists essentially of in combination:
   a. a dewatering sump adapted to contain a liquid at a temperature below its boiling point and free of means to create turbulence in liquid contained within said sump,
   b. a water-separating sump possessing a smaller surface area than the dewatering sump adapted to receive liquid which overflows from the dewatering sump,
   c. means for removing water from the upper portion of the water-separating sump, and
   d. means for transferring liquid from the lower portion of the water-separating sump to the dewatering sump.

13. Apparatus according to claim 11 in which components (a) through (d) are contained within a single treatment vessel and in which the water-separating sump is positioned adjacent the dewatering sump so that liquid which overflows from the dewatering sump falls directly into the water separating sump.

14. Apparatus according to claim 13 in which the dewatering sump and the water-separating sump are equipped with cooling means.

15. Apparatus according to claim 14 in which the means for removing water from the water-separating sump is an overflow pipe and the means for removing liquid from the lower portion of the water-separating sump is a drain pipe.

16. Apparatus according to claim 15 in which the means for transferring the liquid from the water-separating sump to the dewatering sump includes a drying means and a reservoir.

17. Apparatus according to claim 16 in which the dewatering and water-separating sumps are essentially rectangular in shape and are positioned adjacently so that overflow of liquid from the dewatering sump to the water separating sump can take place only over a single wall of the dewatering sump.